(12) United States Patent
Tenghamn

(10) Patent No.: US 10,481,286 B2
(45) Date of Patent: Nov. 19, 2019

(54) MARINE SEISMIC VIBRATOR FOR LOW FREQUENCY AND METHODS OF USE

(71) Applicant: PGS Geophysical AS, Oslo (NO)

(72) Inventor: Stig Rune Lennart Tenghamn, Houston, TX (US)

(73) Assignee: PGS Geophysical AS, Oslo (NO)

( * ) Notice: Subject to any disclaimer, the term of this patent is extended or adjusted under 35 U.S.C. 154(b) by 248 days.

(21) Appl. No.: 15/430,241

(22) Filed: Feb. 10, 2017

(65) Prior Publication Data

US 2017/0299739 A1    Oct. 19, 2017

Related U.S. Application Data

(60) Provisional application No. 62/323,836, filed on Apr. 18, 2016.

(51) Int. Cl.
| | |
|---|---|
| G01V 1/02 | (2006.01) |
| G01V 1/38 | (2006.01) |
| G01V 1/135 | (2006.01) |
| G01V 1/145 | (2006.01) |
| G01V 1/00 | (2006.01) |
| G01V 1/155 | (2006.01) |
| G10K 9/12 | (2006.01) |

(52) U.S. Cl.
CPC .............. *G01V 1/159* (2013.01); *G01V 1/135* (2013.01); *G01V 1/145* (2013.01); *G01V 1/3808* (2013.01); *G01V 1/005* (2013.01); *G01V 1/155* (2013.01); *G01V 2210/1293* (2013.01); *G10K 9/121* (2013.01)

(58) Field of Classification Search
CPC ...... G01V 1/159; G01V 1/145; G01V 1/3808; G01V 1/135; G01V 1/155; G01V 1/005; G01V 2210/1293; G10K 9/121
See application file for complete search history.

(56) References Cited

U.S. PATENT DOCUMENTS

| | | | |
|---|---|---|---|
| 3,384,868 A | 5/1968 | Brown et al. | |
| 4,649,525 A | 3/1987 | Angona et al. | |
| 4,789,968 A | 12/1988 | Rice | |
| 5,080,189 A | 1/1992 | Cole | |
| 6,085,862 A | 7/2000 | Tenghamn | |

(Continued)

FOREIGN PATENT DOCUMENTS

| | | | |
|---|---|---|---|
| AU | 2014202439 | 11/2014 | |
| EP | 3236292 A1 * | 10/2017 | ............ G01V 1/159 |
| WO | WO-2015193695 A1 * | 12/2015 | ............ G01V 1/047 |

OTHER PUBLICATIONS

European Search Report for Application No. 17164563.3 dated Aug. 2, 2017.

*Primary Examiner* — Daniel Pihulic

(57) ABSTRACT

Disclosed are devices and methods for marine geophysical surveying. An example device may comprise a shell, a base plate, wherein the base plate is coupled to the shell, a driver disposed within the shell, an inner spring element disposed within the shell, wherein the inner spring element is coupled to the driver, wherein outer ends of the inner spring element are coupled to outer ends of the inner spring element at spring element junctions, an outer spring element disposed within the shell, wherein outer ends of the outer spring element are coupled to the spring element junctions, and a back mass disposed on the outer spring element.

19 Claims, 4 Drawing Sheets

(56) References Cited

U.S. PATENT DOCUMENTS

| | | | |
|---|---|---|---|
| 6,230,840 B1 | 5/2001 | Ambs | |
| 6,643,222 B2 | 11/2003 | Osborn et al. | |
| 7,377,357 B2 | 5/2008 | Duren et al. | |
| 7,441,628 B2 | 10/2008 | Minto | |
| 7,446,535 B1 | 11/2008 | Tenghamn et al. | |
| 7,881,158 B2 | 2/2011 | Tenghamn | |
| 8,446,798 B2 | 5/2013 | Tenghamn | |
| 8,833,509 B2 | 9/2014 | Meier et al. | |
| 2003/0221901 A1* | 12/2003 | Tenghamn | G01V 1/155 |
| | | | 181/121 |
| 2003/0221910 A1 | 12/2003 | Tenghamn et al. | |
| 2010/0045296 A1 | 2/2010 | Tenghamn | |
| 2010/0322028 A1 | 12/2010 | Tenghamn et al. | |
| 2014/0226439 A1 | 8/2014 | Tenghamn | |
| 2015/0085606 A1 | 3/2015 | Tenghamn et al. | |
| 2017/0299739 A1* | 10/2017 | Tenghamn | G01V 1/159 |

\* cited by examiner

MARINE SEISMIC VIBRATOR FOR LOW FREQUENCY AND METHODS OF USE

CROSS-REFERENCE TO RELATED APPLICATIONS

The present application claims the benefit of U.S. Provisional Application No. 62/323,836, filed Apr. 18, 2016, entitled "Driver for a Dipole Source used for Low Frequency," the entire disclosure of which is incorporated herein by reference.

BACKGROUND

Techniques for marine surveying include marine seismic surveying, in which geophysical data may be collected from below the Earth's surface. Marine seismic surveying has applications in mineral and energy exploration and production to help identify locations of hydrocarbon-bearing formations. Marine seismic surveying typically may include towing a seismic source below or near the surface of a body of water. One more "streamers" may also be towed through the water by the same or a different vessel. The streamers are typically cables that include a plurality of sensors disposed thereon at spaced apart locations along the length of each cable. Some seismic surveys locate sensors on ocean bottom cables or nodes in addition to, or instead of, streamers. The sensors may be configured to generate a signal that is related to a parameter being measured by the sensor. At selected times, the seismic source may be actuated to generate, for example, seismic energy that travels downwardly through the water and into the subsurface formations. Seismic energy that interacts with interfaces, generally at the boundaries between layers of the subsurface formations, may be returned toward the surface and detected by the sensors on the streamers. The detected energy may be used to infer certain properties of the subsurface formations, such as structure, mineral composition and fluid content, thereby providing information useful in the recovery of hydrocarbons.

Most of the seismic sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of seismic source that can be used in seismic surveying includes marine seismic vibrators, including hydraulically powered sources, electro-mechanical vibrators, electrical marine seismic vibrators, and sources employing piezoelectric or magnetostrictive material. Marine seismic vibrators typically generate vibrations through a range of frequencies in a pattern known as a "sweep" or "chirp."

It is well known that as sound waves travel through water and through subsurface geological structures, higher frequency sound waves may be attenuated more rapidly than lower frequency sound waves, and consequently, lower frequency sound waves can be transmitted over longer distances through water and geological structures than higher frequency sound waves. Accordingly, there has been a need for powerful low frequency marine sound sources operating in the frequency band of 1-100 hertz ("Hz"). However, both impulsive-type and marine seismic vibrators that have been used may generate little or no energy below 20 Hz. In addition, low frequency sources typically may have poor efficiency, especially if a good impedance match cannot be obtained.

BRIEF DESCRIPTION OF THE DRAWINGS

These drawings illustrate certain aspects of some of the embodiments of the present disclosure and should not be used to limit or define the disclosure.

DETAILED DESCRIPTION

Embodiments may be directed to marine seismic vibrators and associated methods. At least one embodiment may be directed to a marine seismic vibrator used for marine seismic data acquisition systems, wherein the marine seismic vibrator may generate an up-going wave and a down-going wave with opposite polarity. This type of marine seismic vibrator that generates an up-going wave and a down-going wave with opposite polarity may be referred to as a "dipole source." Embodiments may include marine seismic vibrators operating in a low frequency band in combination with marine seismic vibrators operating in a high frequency band to obtain seismic data over a desired frequency band.

Figure 1:
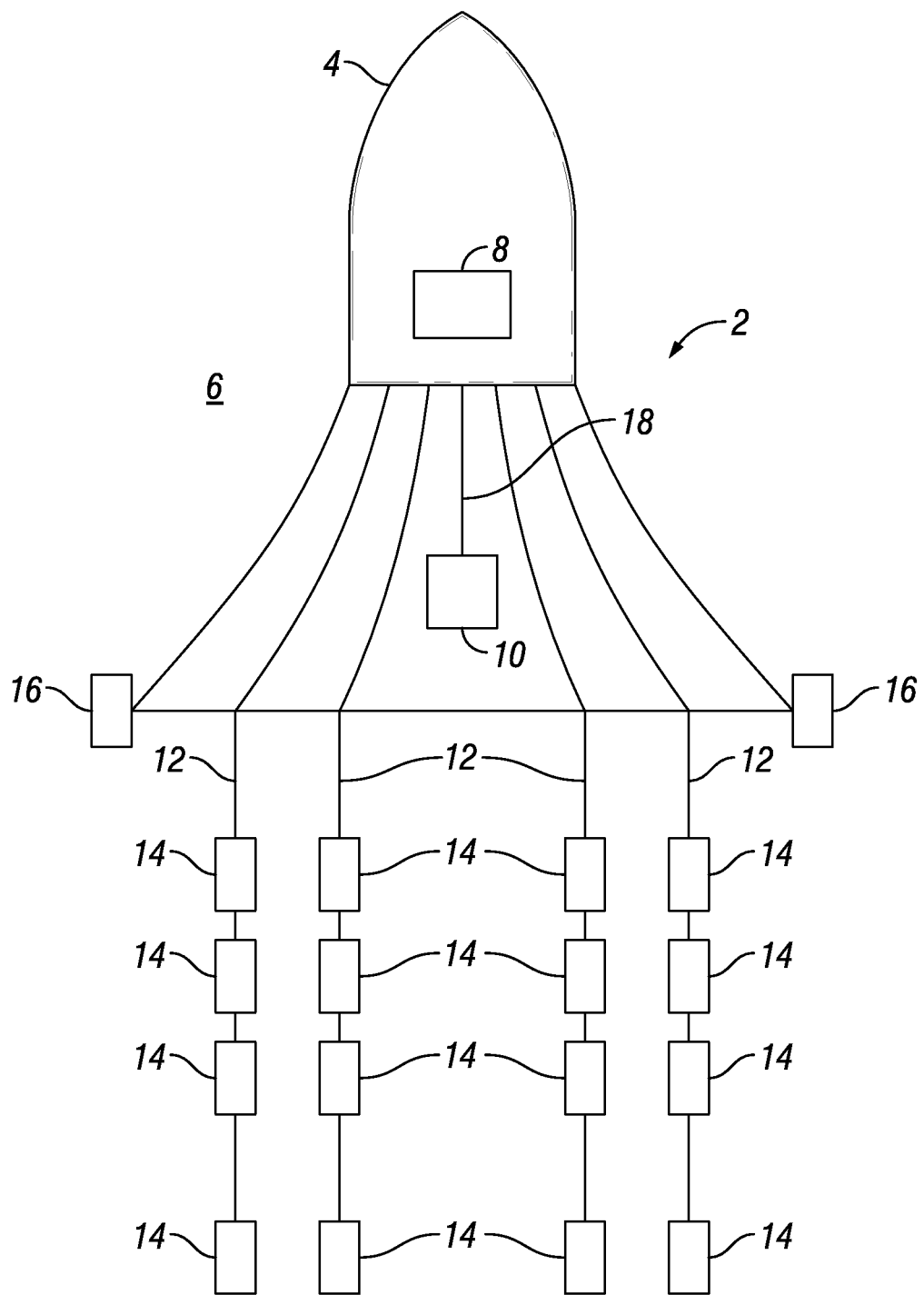
FIG. 1 illustrates an example embodiment of a marine seismic survey system using a marine seismic vibrator.

FIG. 1 illustrates a marine seismic survey system 2 in accordance with example embodiments. Marine seismic survey system 2 may include a survey vessel 4 that moves along the surface of a body of water 6, such as a lake or ocean. The survey vessel 4 may include thereon equipment, shown generally at 8 and collectively referred to herein as a "recording system." The recording system 8 may include devices (none shown separately) for detecting and making a time indexed record of signals generated by each of seismic sensors (explained further below) and for actuating a marine seismic vibrator 10 at selected times. The recording system 8 may also include devices (none shown separately) for determining the geodetic position of the survey vessel 4 and the various seismic sensors.

As illustrated, the survey vessel 4 may tow sensor streamers 12. The sensor streamers 12 may be towed in a selected pattern in the body of water 6 by the survey vessel 4 or a different vessel. As illustrated, the sensor streamers 12 may be laterally spaced apart behind the survey vessel 4. "Lateral" or "laterally," in the present context, means transverse to the direction of the motion of the survey vessel 4. The sensor streamers 12 may each be formed, for example, by coupling a plurality of streamer segments (none shown separately). The sensor streamers 12 may be maintained in the selected pattern by towing equipment 16, such as paravanes or doors that provide lateral force to spread the sensor streamers 12 to selected lateral positions with respect to the survey vessel 4. The sensor streamers 12 may have a length, for example, in a range of from about 2,000 meters to about 12,000 meters or longer. The configurations of the sensors streamers 12 on FIG. 1 is provided to illustrate an example embodiment and is not intended to limit the present disclosure. It should be noted that, while the present example, shows four of the sensor streamers 12, the present disclosure is applicable to any number of sensor streamers 12 towed by survey vessel 4 or any other vessel. For example, in some embodiments, more or less than four of the sensor streamers 12 may be towed by survey vessel 4, and the sensor streamers 12 may be spaced apart laterally, vertically, or both laterally and vertically.

The sensor streamers 12 may include seismic sensors 14 thereon at spaced apart locations. The seismic sensors 14 may be any type of seismic sensors known in the art, including hydrophones, geophones, particle velocity sensors, particle displacement sensors, particle acceleration sensors, or pressure gradient sensors, for example. By way of example, the seismic sensors 14 may generate response signals, such as electrical or optical signals, in response to detecting seismic energy emitted from the marine seismic vibrators 10 after the energy has interacted with the formations (not shown) below the water bottom. Signals generated by the seismic sensors 14 may be communicated to the recording system 8. While not illustrated, the seismic sensors 14 may alternatively be disposed on ocean bottom cables or subsurface acquisition nodes in addition to, or in place of, sensors streamers 12.

In accordance with example embodiments, a geophysical data product indicative of certain properties of the one or more subterranean formations (not shown) may be produced from the detected seismic energy. The geophysical data product may include acquired and/or processed seismic data and may be stored on a non-transitory, tangible, computer-readable medium. The geophysical data product may be produced offshore (i.e. by equipment on a vessel) or onshore (i.e. at a facility on land) either within the United States and/or in another country. Specifically, embodiments may include producing a geophysical data product from at least the measured acoustic energy and storing the geophysical data product on a tangible, non-volatile computer-readable medium suitable for importing onshore. If the geophysical data product is produced offshore and/or in another country, it may be imported onshore to a facility in, for example, the United States or another country. Once onshore in, for example, the United States (or another country), further processing and/or geophysical analysis may be performed on the geophysical data product.

As illustrated in FIG. 1, the survey vessel 4 or a different vessel may further tow marine seismic vibrator 10. In some embodiments, multiple marine seismic vibrators 10 may be used, which may be towed by the survey vessel 4 or different survey vessels, for example. Although only a single marine seismic vibrator 10 is shown, it should be understood that more than one marine seismic vibrator 10 may be used as desired for a particular application. A source cable 18 may couple the marine seismic vibrator 10 to the survey vessel 4. The source cable 18 may take drag forces and also may include electrical conductors (not shown separately) for transferring electrical current from the recording system 8 on the survey vessel 4 to the marine seismic vibrator 10. The source cable 18 may also include signal cables or fibers for transmitting signals to and/or from the marine seismic vibrator 10 to the recording system 8. The source cable 18 may also include strength members (not shown separately) for transmitting towing force from the survey vessel 4 to the marine seismic vibrator 10. The source cable 18 may also contain conductors for transmitting air to the marine seismic vibrator 10 for pressure compensation, for example. The source cable 18 may have a length in a range of from about 200 meters to about 2,000 meters or longer, for example. In some embodiments, the source cable 18 may be about 900 meters long and have an outer diameter of about 65 millimeters. In some embodiments, the source cable 18 may be relatively parallel to the surface of the body of water 6, while in other embodiments, the source cable 18 may utilize depth control mechanisms, for example, to locate more than one marine seismic vibrator 10 at a plurality of different depths.

In contrast to impulsive-type sources which transmit energy during a very limited amount of time, the marine seismic vibrator 10 may have a reduced environmental impact due the distribution of energy over time. In particular, the marine seismic vibrator 10 may have a reduced peak amplitude of the transmitted seismic signal during a seismic survey with little or no reduction in the data quality. For example, by using a marine seismic vibrator 10 with, for example, a five-second sweep, instead of an impulsive-type source such as an air gun, the peak amplitudes can be reduced by as much as 30 dB or even more. If pseudo-noise source sequences are used to not only spread out the energy over time but also the frequency over time, the peak amplitudes may be reduced by another 20 dB or even more. In some embodiments, the peak amplitudes may be in the range of about 10 dB to about 40 dB.

Figure 2A:
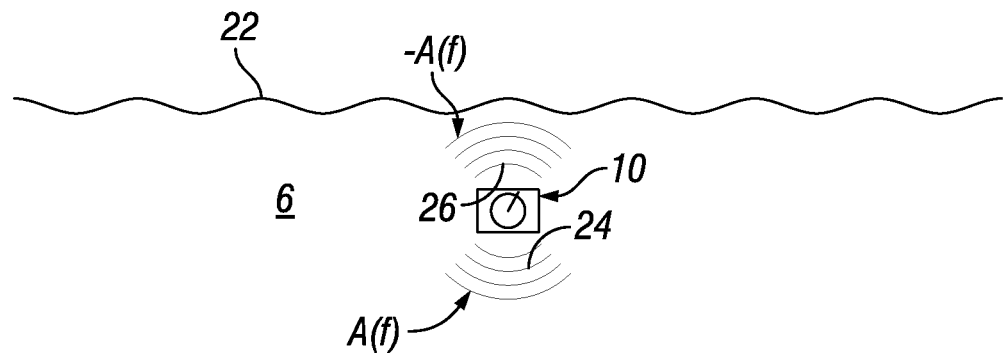
FIG. 2A illustrates an example embodiment of generation of acoustic waves by a marine seismic vibrator.
Figure 2B:
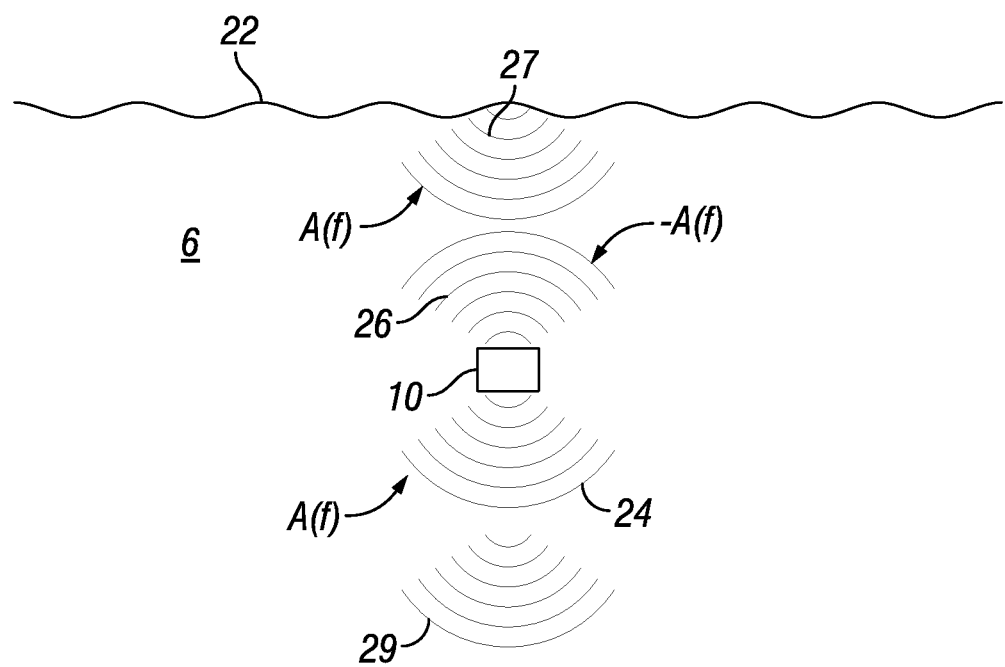
FIG. 2B illustrates another example embodiment of generation of acoustic waves by a marine seismic vibrator.

FIG. 2A illustrates generation of acoustic waves in body of water 6 by marine seismic vibrator 10 in accordance with example embodiments. The marine seismic vibrator 10 may be positioned below a water surface 22. The marine seismic vibrator 10 may be operated in body of water 6 to generate acoustic waves with opposite polarity, illustrated on FIG. 2A as down-going wave 24 and up-going wave 26 with opposite polarity. Down-going wave 24 may be at a low frequency. In some embodiments, down-going wave 24 may have a frequency between about 0.1 Hz and about 100 Hz, alternatively, between about 0.1 Hz and about 10 Hz, and alternatively, between about 0.1 Hz and about 5 Hz. Down-going wave 24 may have a frequency spectrum of A(f), while up-going wave 26 may be created with reverse polarity, or frequency spectrum of −A(f). Up-going wave 26 may also be at a low frequency. In some embodiments, up-going wave 26 may have a frequency between about 0.1 Hz and about 100 Hz, alternatively, between about 0.1 Hz and about 10 Hz, and alternatively, between about 0.1 Hz and about 5 Hz. As illustrated by FIG. 2B, up-going wave 26 may be reflected off the water surface 22 to provide reflected wave 27, which may then have the same polarity, A(f) as the down-going wave 24. At low frequencies, these two down-going waves (e.g., down-going wave 24 and reflected wave 27) may combine substantially in-phase to provide a composite wave 29 that is down going. The amplitude spectrum radiated by the marine seismic vibrator 10 may be modulated by the amplitude of a cosine function. Therefore, the resulting composite wave 29 may retain amplitudes at low frequencies, since the low frequencies may not be attenuated by destructive interference.

Figure 3:
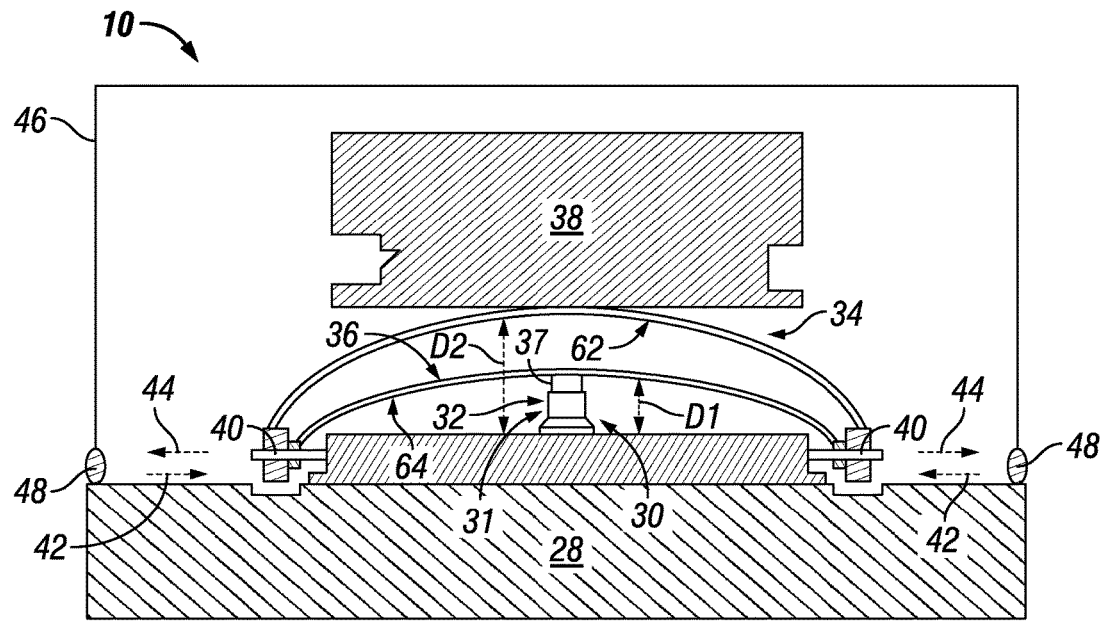
FIG. 3 illustrates an example embodiment of a marine seismic vibrator with inner and outer spring elements.

FIG. 3 illustrates a marine seismic vibrator 10 in accordance with example embodiments. The marine seismic vibrator 10 of FIG. 3 may be operated to generate acoustic waves with opposite polarity (e.g., down-going wave 24 and up-going wave 26 shown on FIG. 2A). The marine seismic vibrator 10 may include a base plate 28 and a driver 31 coupled to the base plate 28. The base plate 28 may support and position the driver 31 in the marine seismic vibrator 10. The driver 31 may include a magnetic circuit 30 and an electric coil 32. The marine seismic vibrator 10 may further include an outer spring element 34 coupled to spring element junctions 40 and an inner spring element 36 coupled to spring element junctions 40. The driver 31 may be coupled to the outer spring element 34 and the inner spring element 36. In operation, the driver 31 may be operable to drive the outer spring element 34 and the inner spring element 36. For example, the driver 31 may be operated to move (flex) outer spring element 34 and inner spring element 36 back and forth (e.g., vertically up and down) relative to base plate 28. In embodiments where the driver 31 comprises the magnetic circuit 30 and electric coil 32, the magnetic circuit 30 may be operated to cause movement of electric coil 32, which in turn drives the outer spring element 34 and the inner spring element 36. It should be understood that the present disclosure should not be limited to the particular configuration shown on FIG. 3, and other configurations of the marine seismic vibrator 10 may be used in accordance with embodiments of the present disclosure.

Base plate 28 may have any suitable configuration. For example, base plate 28 may be circular, polygonal, elliptical, or combinations thereof. In some embodiments, base plate 28 may have any suitable dimensions, including, but not limited to, a height ranging from about 2 inches to about 10 inches, a length from about 30 inches to about 200 inches, a width from about 30 inches to about 200 inches, and a thickness from about 2 inches to about 10 inches. Embodiments of base plate 28 may be solid and made from any suitable material, including, but not limited to, rubber, plastic, metal, or combinations thereof. Base plate 28 may have any suitable mass, including, but not limited to, a mass ranging from about 30 kg to about 4000 kg.

Driver 31 may be coupled to base plate 28. As previously mentioned, base plate 28 may support and position driver 31 in the marine seismic vibrator 30. While the driver 31 drives the inner spring element 36, in some embodiments, the base plate 28 may remain stationary with respect to the inner spring element 36. Spring 54 may generate a resonance together with back mass 38. Embodiments of driver 31 may comprise magnetic circuit 30 and electric coil 32. Magnetic circuit 30 may be coupled to base plate 28. Without limitation, the magnetic circuit 30 may be coupled to base plate 28 by any suitable means, such as, for example, threads, welds, adhesive, and/or mechanical fasteners. Magnetic circuit 30 may be operable, for example, to displace electric coil 32, for example, causing electric coil 32 to move back and forth, thus driving the inner spring element 36. As illustrated, electric coil 32 may be coupled to inner spring element 36, for example, by way of transmission element 37.

Marine seismic vibrator 30 may further include spring elements, illustrated on FIG. 3 as outer spring element 34 and inner spring element 36. In embodiments, the outer spring element 34 and inner spring element 36 may be shaped as flexible plates, flexible rods, flexible beams, or flexible bars, for example. Outer ends of the outer spring element 34 and inner spring element 36 may be coupled to spring element junctions 40 by any suitable means, such as, for example, threads, welds, adhesive, and/or mechanical fasteners.

As illustrated, a back mass 38 may be disposed on the outer spring element 34. In the illustrated embodiment, the back mass 38 is secured on the opposite of the outer spring element 34 to the inner spring element 36. Back mass 38 may have any suitable configuration. Without limitation, back mass 38 may be circular, polygonal, elliptical, or combinations thereof. Back mass 38 may be solid and made from any suitable material, including, but not limited to, rubber, plastic, metal, or combinations thereof. In some embodiments, back mass 38 may have any suitable mass, including, but not limited to, a mass ranging from about 50 kg to about 5000 kg. In some embodiments, back mass 38 may have any suitable dimensions, including, but not limited to, a height ranging from about 2 inches to about 30 inches, a length from about 30 inches to about 200 inches, a width from about 30 inches to about 200 inches and a thickness from about 2 inches to about 30 inches. The electric coil 32 may be configured to act upon inner spring element 36. As inner spring element 36 and outer spring element 34 are coupled at spring element junctions, movement of inner spring element 36 should be transferred to outer spring element 34, thus also driving outer spring element 34. As the outer spring element 34 is driven, the back mass 38 may move (e.g., vertically (up and down) relative to the base plate 28). By movement (e.g., vibration) of both the outer spring element 34 and inner spring element 36 two resonance frequencies may be generated. In addition, the outer spring element 34 and inner spring element 36 may generate acoustic waves with opposite polarity. The back mass 38 may be configured (e.g., adding or removing weight) to adjust a resonance frequency and may be coupled to outer spring element 34 by any suitable means, such as, for example, threads, welds, adhesive, and/or mechanical fasteners.

With continued reference to FIG. 3, electric coil 32 may be used to move (flex) outer spring element 34 and inner spring element 36 vertically (up and down), relative to base plate 28. In some embodiments, the marine seismic vibrator 10 may be driven by voice coils (e.g., electric coil 32) and/or by linear motors (e.g., linear motors 50 shown on FIG. 4) because the frequency may be low, such as, for example, the frequency may be less than 10 Hz. As electric coil 32 drives inner spring element 36 upward, spring element junctions 40 may move inward (movement may be perpendicular to electric coil 32), i.e., in the direction of arrows 42, thereby causing outer spring element 34 to move upward, thereby increasing vertical distances $D_1$ and $D_2$, as illustrated. As electric coil 32 drives inner spring element 36 downward, spring element junctions 40 may move outward (movement may be perpendicular to electric coil 32), i.e., in the direction of arrows 44, thereby causing outer spring element 34 to move downward, thereby decreasing vertical distances $D_1$ and $D_2$, as illustrated. $D_1$ may be measured from base plate 28 to the apex of inner spring element 36. $D_2$ may be measured from the base plate 28 to the apex of outer spring element 34. The inward and outward movements of spring element junctions 40 may create a pressure wave which may propagate outward and result in acoustic waves in the body of water 6 (as shown on FIG. 1). In some embodiments, the marine seismic vibrator 10 may display at least two resonance frequencies in the seismic frequency band, typically a range between about 1 Hz and about 300 Hz. In other embodiments, the seismic frequency band may be between about 5 Hz and about 100 Hz. By varying the eccentricity of the outer spring element 34 and the inner spring element 36 and the transmission rate in the electric coil 32, embodiments may be adapted to different situations.

Additionally, marine seismic vibrator 10 may include shell 46 in which magnetic circuit 30, outer spring element 34, inner spring element 36, and electric coil 32 may be disposed. In some embodiments, shell 46 may include seals 48 disposed between base plate 28 and shell 46, as illustrated. Shell 46 may keep any outside fluid from entering marine seismic vibrator 10. Shell 46 may include any suitable shape, such as, for example, elliptical, polygonal, or combinations thereof.

In certain embodiments, the electric coil 32 may be a "moving coil" or "voice coil" actuator, which may provide the ability to generate very large acoustic amplitudes. Seismic sources using one or more moving coil actuators may be referred to as "moving coil" projectors. Although FIG. 3 illustrates a single, uni-directional electric coil 32, embodiments with one or more bi-directional drivers or in which a plurality of actuators are used in parallel are within the scope of the present disclosure.

As further illustrated by FIG. 3, the electric coil 32 may be centrally mounted on base plate 28 and positioned perpendicular to base plate 28, as illustrated. The base plate 28 may be capable of suspending the electric coil 32 within the shell 46. The base plate 28 may be coupled to the shell 46. In some embodiments, the magnetic circuit 30 may comprise electromagnetic parts that may be mounted on the base plate 28. The resulting force for one electric coil 32 may be expressed by the following formula:

$$F = IlB \quad \text{(Eq. 1)}$$

wherein I is the current in the particular electric coil 32, l is the length of the conductor in the electric coil 32, and B is the magnetic flux density. Depending on the desired force, either the size of the electric coil 32 or the number of electric coils 32 coupled to each of outer spring element 34 and inner spring element 36 may be varied. Transmission element 37 may be used to transfer force from the electric coil 32 to outer spring element 34 and inner spring element 36. More than one transmission element 37 along the axis of base plate 28 with at least electric coil 32 may also be used. As illustrated, outer spring element 34 and inner spring element 36 may be disposed within the shell 46 and may generally form a resonance system for more efficiently generating acoustic energy in a marine environment. Outer spring element 34 and inner spring element 36 may have a slightly arched shape. The transmission of force may depend on the curvature of outer spring element 34 and inner spring element 36. In certain embodiments, outer spring element 34 and inner spring element 36 may vibrate in the same direction, at the same time. In other embodiments, as outer spring element 34 vibrates toward its backside 62, inner spring element 36 may vibrate away from its backside 64. And, as the inner spring element 36 vibrates toward its backside 64, the outer spring element 34 may vibrate away from its backside 62. Therefore, an up-going wave (e.g., up-going wave 26 shown on FIG. 2A) produced from the outer spring element 34 may have reverse polarity with the first down-going wave (e.g., down-going wave 24 shown on FIG. 2B) produced from the inner spring element 36, thereby enabling the marine seismic vibrator 10 to retain lower frequencies. With additional reference to FIG. 2B, in at least one embodiment, the up-going wave 26 may reflect off water surface 22 as a reflected wave 27 with the same polarity as the down-going wave 24, and the reflected wave 27 may combine with a down-going wave 24 substantially in-phase to form a composite wave 29. A reflection from the water surface 22 may cause sound radiated from the outer spring element 34 to change phase by 180° and become in-phase with energy from the inner spring element 36.

As previously described, the marine seismic vibrator 10 may display at least two resonance frequencies within a seismic frequency band, typically a range between about 1 Hz and about 300 Hz. For example, outer spring element 34 and inner spring element 36 may be configured to provide two resonance frequencies to acoustic waves generated by the marine seismic vibrator 10. The first resonance frequency may be from outer spring element 34 and the back mass 38. The second resonance frequency may be from the inner spring element 36, i.e., second resonance mode. These two resonance frequencies may be selected independently providing a large degree of flexibility when optimizing the performance. In some embodiments, the first resonance frequency may be within a two octave band of the low end of the seismic frequency band and, alternatively, within one octave bend. In some embodiments, the second resonance frequency may be within a four octave band of the first resonance frequency and, alternatively, within three octave bands. By way of example, assuming a seismic frequency band of from 5 Hz to 25 Hz, a first resonance frequency may be 7 Hz and a second resonance frequency may be 22 Hz. A high efficiency may be achieved if two resonance frequencies separated in the frequency band of interest are used.

Figure 4:
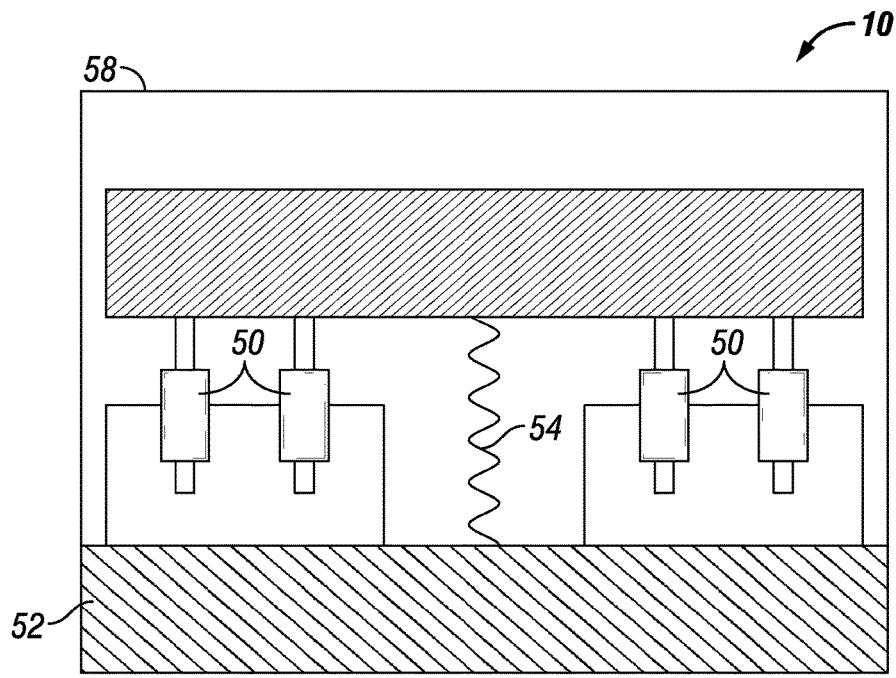
FIG. 4 illustrates an example embodiment of a marine seismic vibrator with linear motors.

FIG. 4 illustrates a marine seismic vibrator 10 in accordance with another example embodiment. The marine seismic vibrator 10 of FIG. 4 may be operated to generate acoustic waves with opposite polarity (e.g., down-going wave 24 and up-going wave 26 shown on FIG. 2A). In the illustrated embodiment, the marine seismic vibrator 10 includes linear motors 50 coupled to a base plate 52. The base plate 52 may support and position the linear motors 50 in the marine seismic vibrator 10. Base plate 52 may have a mass ($M_1$). As illustrated, marine seismic vibrator 10 may further include a moving mass 56 with a mass ($M_2$) and a spring 54 positioned between the base plate 52 and the moving mass 56. The plurality of linear motors 50 may be operable to cause the moving mass 56 to move back and forth (e.g., up and down (vertically)) relative to base plate 52 to generate acoustic waves with opposite polarity. While the moving mass 56 is driven, the base plate 52 may remain stationary such that the moving mass 56 is moving relative to the base plate 52. Spring 54 may generate a resonance together with moving mass 56. Base plate 52 may have any suitable configuration. For example, base plate 52 may be circular, polygonal, elliptical, or combinations thereof. In some embodiments, base plate 52 may have any suitable dimensions, including, but not limited to, a height ranging from about 2 inches to about 10 inches, a length from about 30 inches to about 200 inches, a width from about 30 inches to about 200 inches and a thickness from about 2 inches to about 10 inches. Embodiments of base plate 52 may be solid and made from any suitable material, including, but not limited to, rubber, plastic, metal, or combinations thereof. Base plate 52 may have any suitable mass ($M_1$), including, but not limited to, a mass ($M_1$) ranging from about 30 kg to about 4000 kg.

The movement of moving mass 56 may cause pressure waves, which may propagate outward and result in acoustic waves in the body of water (e.g., down-going wave 24 and up-going wave 26 in body of water 6 shown on FIG. 2A). Moving mass 56 may have any suitable mass ($M_2$), including, but not limited to, a mass ($M_2$) ranging from about 50 kg to about 5000 kg. In certain embodiments, the mass ($M_1$) of base plate 52 may be substantially less than the mass ($M_2$) of moving mass 56. For example, mass ($M_0$) of base plate 52 may be 50% or less of the mass ($M_2$) of moving mass 56. In at least one embodiment, the moving mass 56 may be physically larger than the base plate 52. For example, moving mass 56 may have a volume that is larger than base plate 52 by 5%, 10%, 20%, or more. In some embodiments, moving mass 56 may have any suitable dimensions, including, but not limited to, a height ranging from about 2 inches to about 30 inches, a length from about 30 inches to about 200 inches, a width from about 30 inches to about 200 inches and a thickness from about 2 inches to about 30 inches. Embodiments of moving mass 56 may be solid and made from any suitable material, including, but not limited to, rubber, plastic, metal, or combinations thereof. Moving mass 56 may have any suitable configurations. For example, moving mass 56 may be circular, polygonal, elliptical, or combinations thereof. The plurality of linear motors 50 may be configured to drive/move the moving mass 56 such that one resonance frequency may be generated.

Additionally, marine seismic vibrator 10 may include shell 58. Shell 58 may keep any outside fluid from entering marine seismic vibrator 10. Shell 58 may include any suitable shape, such as, for example, elliptical, polygonal, or combinations thereof. In the illustrated embodiment, moving mass 56 and linear motors 50 may be disposed in shell 58. As illustrated, shell 58 may be secured to base plate 52. Any suitable means may be used to secure shell 58 to base plate 52, such as, for example, threads, welds, adhesive, and/or mechanical fasteners. While not shown, seals may also be used to prevent water intrusion into shell 58.

As illustrated, the spring 54 may extend between the base plate 52 and the moving mass 56. In some embodiments, the spring 54 may be coupled to the base plate 52 on one end and to the moving mass 56 on the opposite end. Spring 54 may be any suitable spring element, including, but not limited to, coil springs, leaf springs, and disc springs (Bellville washers), among others. The spring 54 may provide a force to the moving mass 56 that opposes the linear motors 50 acting on the moving mass 56. The spring 54 may create a resonance together with the moving mass 56. This spring-mass system may normally be selected to be in the lower end of the frequencies to be generated. Without a resonance, the system may become very inefficient.

Figure 5:
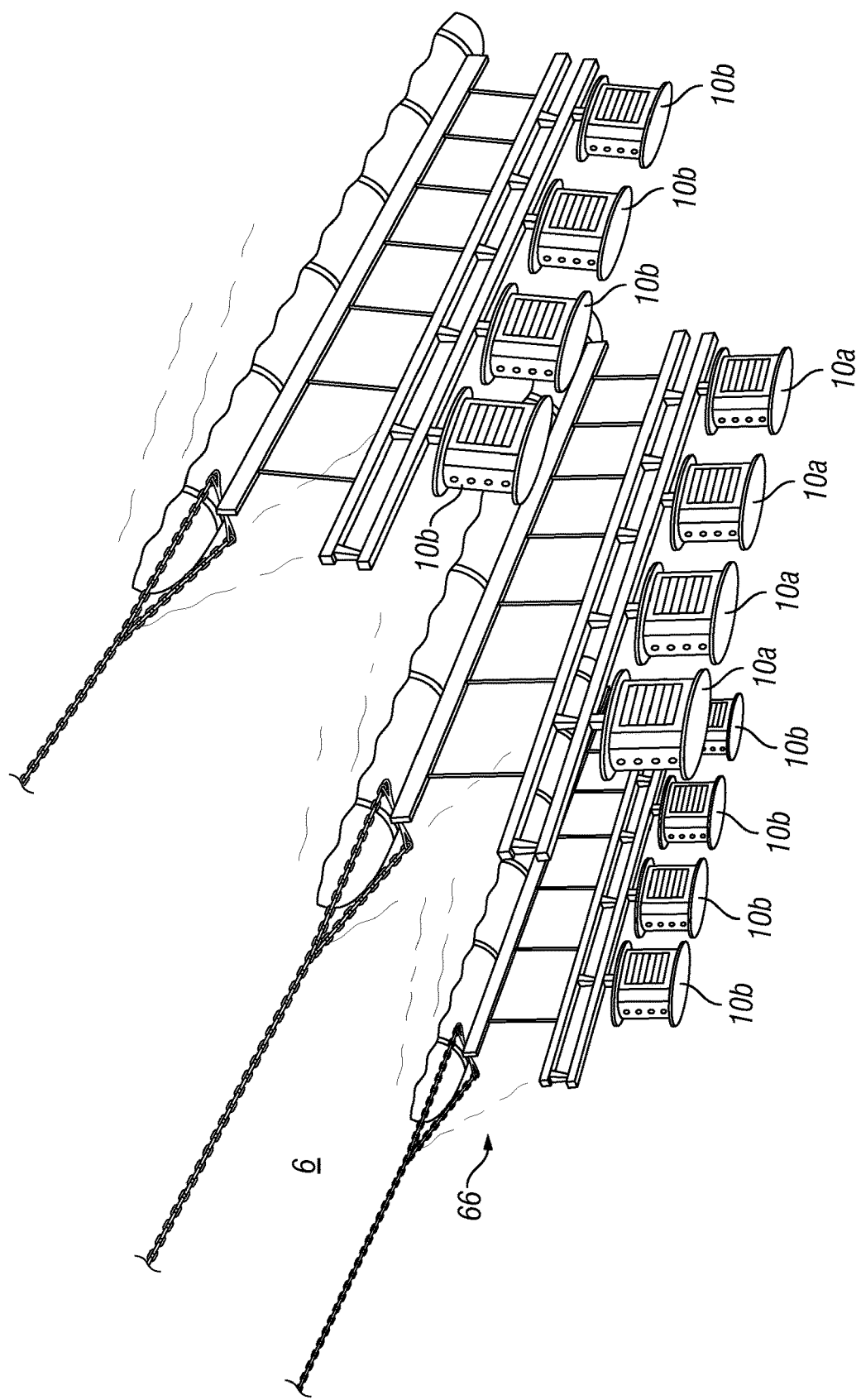
FIG. 5 illustrates an example embodiment of an array of marine seismic vibrators being towed through a body of water.

Referring now to FIG. 5, an array 66 of marine seismic vibrators 10a, 10b is illustrated in accordance with example embodiments. The marine seismic vibrators 10a, 10b will be referred to herein collectively as marine seismic vibrators 10a, 10b and individually as low frequency marine seismic vibrators 10a and high frequency marine seismic vibrators 10b. The array 66 of marine seismic vibrators 10a, 10b may be used, for example, to generate a desired acoustic output. FIG. 5 illustrates an array 66 of marine seismic vibrators 10a, 10b towed through a body of water 6. Correlation noise may be low as the marine seismic vibrators 10a, 10b use different frequencies. For example, two or more marine seismic vibrators 10a, 10b may be used contemporaneously or even simultaneously. As would be understood by one of ordinary skill in the art with the benefit of this disclosure, energy emitted from the array 66 would appear in the formations below the water bottom as if it emanated from a point source when the dimensions of the array 66 are on the order of 30 meters or less. The marine seismic vibrators 10a, 10b may comprise one or more low frequency marine seismic vibrators 10a, for example, operating in the range of about 5 Hz to about 25 Hz and one or more high frequency vibrators 10b operating from about 25 Hz to about 100 Hz. In some embodiments, the one or more of the low frequency marine seismic vibrators 10a and the one or more of the high frequency marine seismic vibrators 10b may each have two resonance frequencies. Embodiments may include use of a nonlinear sweep to enhance output of particular frequency band, or the number of marine seismic vibrators 10a, 10b can be increased to thereby avoid the frequency bands where the amplitude spectrum is below a specified value.

The particular embodiments disclosed above are illustrative only, as the described embodiments may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this disclosure.

What is claimed is:

1. A marine seismic vibrator comprising:
   a shell;
   a base plate, wherein the base plate is coupled to the shell;
   a driver disposed within the shell;
   an inner spring element disposed within the shell, wherein the inner spring element is coupled to the driver;
   an outer spring element disposed within the shell, wherein outer ends of the outer spring element are coupled to outer ends of the inner spring element at spring element junctions; and
   a back mass disposed on the outer spring element, wherein the inner spring element and the outer spring element are configured to propagate acoustic waves of opposite polarity.

2. The marine seismic vibrator of claim 1, wherein the driver comprises a magnetic circuit and an electric coil, wherein the electric coil is positioned perpendicular to the base plate.

3. The marine seismic vibrator of claim 2, wherein the spring element junctions are configured to move perpendicular to the driver, thereby increasing or decreasing distances from an apex of the outer spring element to the base plate.

4. The marine seismic vibrator of claim 1, wherein the inner spring element and the outer spring element each comprise flexible rods.

5. The marine seismic vibrator of claim 1, wherein the inner spring element and the outer spring element are configured to provide two resonance frequencies to acoustic waves generated by the marine seismic vibrator.

6. A marine seismic vibrator comprising:
   a shell;
   a base plate, wherein the base plate is coupled to the shell;
   a linear motor disposed within the shell;
   a moving mass disposed within the shell, wherein a mass of the base plate is less than a mass of the moving mass; and
   a spring positioned between the moving mass and the base plate, wherein the spring is coupled to the base plate on one end and to the moving mass on the opposite end.

7. The marine seismic vibrator of claim 6, wherein the linear motor is configured to drive the moving mass to propagate acoustic waves of opposite polarity.

8. The marine seismic vibrator of claim 7, wherein the linear motor is configured to provide one resonance frequency to acoustic waves generated by the marine seismic vibrator.

9. The marine seismic vibrator of claim 6, wherein the mass of the base plate is 50% or less than the mass of the moving mass.

10. A method for operating a marine seismic vibrator to generate acoustic waves with opposite polarity:
    towing a marine seismic vibrator through a body of water;
    operating a driver of the marine seismic vibrator to cause an inner spring element of the marine seismic vibrator to move back and forth relative to a base plate of the marine seismic vibrator, the driver being coupled to the base plate; and
    transferring movement of the inner spring element to cause an outer spring element of the marine seismic vibrator together with a back mass disposed on the outer spring element to also move back and forth relative to the base plate;
    generating a down-going wave in the body of water and an up-going wave in the body of water, wherein the down-going wave and the up-going wave have opposite polarity;
    reflecting the up-going wave off of a water surface of the body of water to provide a reflected wave, wherein the reflected wave has the same polarity as the down-going wave; and
    combining the reflected wave with the down-going wave to produce a composite wave in the body of water.

11. The method of claim 10, wherein the inner spring element and outer spring element are coupled at spring element junctions, the transferring movement comprises moving an apex of the inner spring element away from the base plate to cause the spring element junctions to move inward thereby causing an apex of the outer spring element to move away from the base plate.

12. The method of claim 10, wherein the back mass is from about 50 kg to about 5000 kg.

13. The method of claim 10, wherein the acoustic waves comprise an up-going wave and a down-going wave, the down-going wave having reverse polarity with the up-going wave.

14. The method of claim 13, wherein the up-going wave has a frequency between about 0.1 hertz and about 100 hertz, and wherein the down-going wave has a frequency between about 0.1 hertz and about 100 hertz.

15. The method of claim 10, wherein the marine seismic vibrator displays at least two resonance frequencies within a seismic frequency band of between about 1 hertz and about 300 hertz.

16. A method for marine seismic surveying comprising:
    towing a marine seismic vibrator through a body of water;
    operating a linear motor of the marine seismic vibrator to cause a moving mass of the marine seismic vibrator to move back and forth relative to a base plate of the marine seismic vibrator thereby generating acoustic waves with opposite polarity, the linear motor being coupled to the base plate; and
    applying a force with a spring to the moving mass that opposes a force produced from the linear motor, wherein the spring is positioned between the moving mass and the base plate, wherein the spring is coupled to the base plate on one end and to the moving mass on the opposite end.

17. The method of claim 16, wherein the acoustic waves comprise an up-going wave and a down-going wave, the down-going wave having reverse polarity with the up-going wave.

18. The method of claim 17, wherein the up-going wave has a frequency between about 0.1 hertz and about 100 hertz, and wherein the down-going wave has a frequency between about 0.1 hertz and about 100 hertz.

19. The method of claim 17, wherein the spring is positioned between the moving mass and the base plate.

* * * * *